United States Patent
Bull et al.

(10) Patent No.: US 11,244,116 B2
(45) Date of Patent: Feb. 8, 2022

(54) AUTOMATICALLY BOOTSTRAPPING A DOMAIN-SPECIFIC VOCABULARY

(71) Applicant: INTERNATIONAL BUSINESS MACHINES CORPORATION, Armonk, NY (US)

(72) Inventors: Brendan Bull, Durham, NC (US); Paul Lewis Felt, Springville, UT (US); Andrew G. Hicks, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 219 days.

(21) Appl. No.: 16/559,012

(22) Filed: Sep. 3, 2019

(65) Prior Publication Data

US 2021/0064702 A1 Mar. 4, 2021

(51) Int. Cl.
*G06F 40/30* (2020.01)
*G06N 3/08* (2006.01)
*G06N 3/04* (2006.01)

(52) U.S. Cl.
CPC .......... *G06F 40/30* (2020.01); *G06N 3/0445* (2013.01); *G06N 3/08* (2013.01)

(58) Field of Classification Search
CPC ......... G06F 40/30; G06N 3/0445; G06N 3/08
See application file for complete search history.

(56) References Cited

U.S. PATENT DOCUMENTS

| | | | |
|---|---|---|---|
| 9,171,263 B2 | 10/2015 | Flinn et al. | |
| 9,348,806 B2 | 5/2016 | Clarkson | |
| 10,114,861 B2 | 10/2018 | Poon et al. | |
| 10,210,860 B1 | 2/2019 | Ward et al. | |
| 10,216,834 B2 | 2/2019 | Bull | |
| 10,642,875 B2 | 5/2020 | Bull | |
| 2008/0294624 A1* | 11/2008 | Kanigsberg | G06Q 30/0625 |
| 2012/0166180 A1* | 6/2012 | Au | G06F 40/253 |
| | | | 704/9 |
| 2019/0034416 A1* | 1/2019 | Al Hasan | G06N 3/0454 |
| 2019/0108832 A1 | 4/2019 | Tomar et al. | |

OTHER PUBLICATIONS

Dasgupta et al. "Enhancing software traceability by automatically expanding corpora with relevant documentation." 2013 IEEE International Conference on Software Maintenance. IEEE, 2013, pp. 320-329.

(Continued)

*Primary Examiner* — Kevin Ky
(74) *Attorney, Agent, or Firm* — L. Jeffrey Kelly

(57) ABSTRACT

A computer-implemented method, system and computer program product for automatically bootstrapping a domain-specific vocabulary from at least one source document using one or more computers, by: (a) encoding one or more passages in the source document to identify one or more relevant words therein, wherein the encoding assigns an importance to the relevant words using an attention mechanism (AM) on top of a recurrent neural network (RNN); (b) expanding the relevant words using word embedding distance, ontology information, or multi-part analogies; and (c) mapping the expanded words to concepts for inclusion into the domain-specific vocabulary, wherein concept disambiguation is performed to ensure that incorrect concepts are not included into the domain-specific vocabulary.

20 Claims, 6 Drawing Sheets

(56) References Cited

OTHER PUBLICATIONS

Luong et al., "Ontology learning using word net lexical expansion and text mining." Theory and Applications for Advanced Text Mining. IntechOpen, 2012, pp. 101-133.
Gao et al., "Mining business contracts for service exceptions" IEEE Transactions on Services Computing 5.3 (2012), pp. 333-344.
Yao et al., "Query Processing based on Associated Semantic Context Inference", 2015 2nd International Conference on Information Science and Control Engineering, pp. 395-399.
Kiros et al., "Skip-Thought Vectors," http://arxiv.org/abs/1506.06726, pp. 1-11, Jun. 22, 2015.
Rocktaschel et al., "Reasoning about Entailment with Neural Attention," https://arxiv.org/pdf/1509.06664.pdf, pp. 1-9, Mar. 1, 2016.
Goldberg, "A Primer on Neural Network Models for Natural Language Processing". http://www.cs.biu.ac..il/~yogo/nnlp.pdf. 75 pages, Oct. 6, 2015.

\* cited by examiner

AUTOMATICALLY BOOTSTRAPPING A DOMAIN-SPECIFIC VOCABULARY

BACKGROUND

Natural language processing (NLP) utilizes inferential statistics to produce "models" trained using supervised machine learning. These models infer entities within textual data, and then infer relationships (correlations) between those entities.

After training, the models would be able to read source documents within a subject matter domain and extract knowledge contained within the source documents. That information could then be surfaced to end users of the system.

Training and using the models requires dictionaries, also referred to as vocabularies, as well as source documents. These vocabularies comprise typically comprise a list of domain specific terms and their associated concepts. Often, creating such a list requires significant manual efforts by a subject matter expert (SME).

Currently, an SME has to annotate all of the relevant words and concepts in the source documents, which is time consuming. Such a manual process is also likely to miss related but relevant words and concepts that are not in the source documents.

Thus, there is need for improved methods and systems to automate the creation of domain-specific vocabularies from source documents. The present invention satisfies this need.

SUMMARY

The invention provided herein has a number of embodiments useful, for example, in a computer-implemented method, system and computer program product, for automatically bootstrapping a domain-specific vocabulary from at least one source document, by: (a) encoding one or more passages in the source document to identify one or more relevant words therein, wherein the encoding assigns an importance to the relevant words using an attention mechanism (AM) on top of a recurrent neural network (RNN); (b) expanding the relevant words using word embedding distance, ontology information, or multi-part analogies; and (c) mapping the expanded words to concepts for inclusion into the domain-specific vocabulary, wherein concept disambiguation is performed to ensure that incorrect concepts are not included into the domain-specific vocabulary.

DRAWINGS

Referring now to the drawings in which like reference numbers represent corresponding parts throughout:

DETAILED DESCRIPTION

In the following description, reference is made to the accompanying drawings which form a part hereof, and in which is shown by way of illustration one or more specific embodiments in which the invention may be practiced. It is to be understood that other embodiments may be utilized and structural and functional changes may be made without departing from the scope of the present invention.

Overview

The present invention is directed to creating a cartridge authoring tool that allows an SME to create reusable assets for a specific domain. A "cartridge" is a collection of assets that may include dictionaries, filter rules, machine learning (ML) models, etc.

One of the main issues in creating the cartridge authoring tool is creating domain-specific dictionaries or vocabularies. As noted above, an SME currently has to manually annotate all of the relevant words and concepts in source documents, which is time consuming, and also likely to miss related but relevant words and concepts that are not in the source documents.

Figure 1:
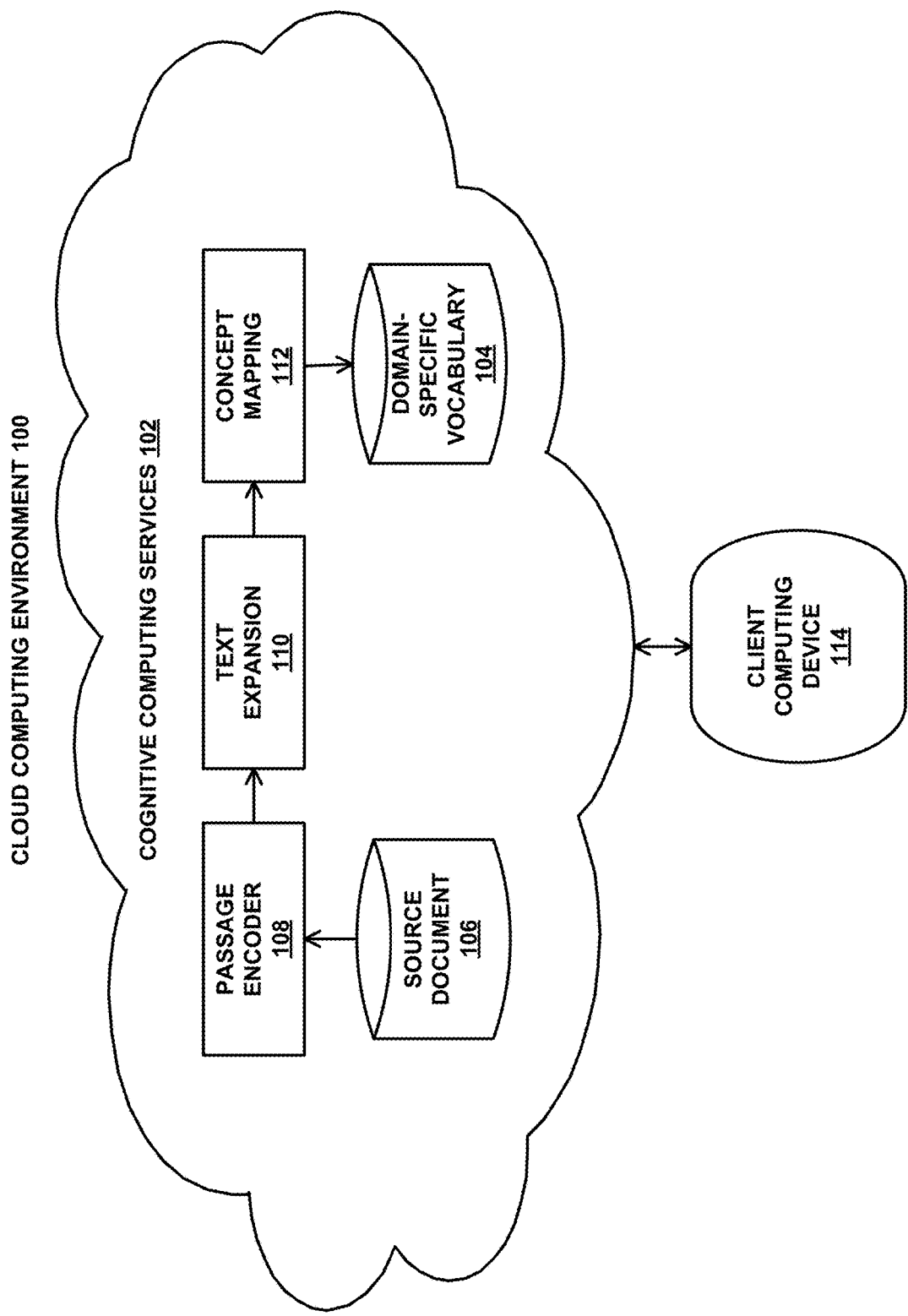
FIG. 1 illustrates an exemplary method and system, according to an embodiment of the present invention.

FIG. 1 illustrates an exemplary method and system, according to an embodiment of the present invention. A cloud computing environment 100 is used for implementing cognitive computing services 102 that provide for automatically bootstrapping a domain-specific vocabulary 104 from at least one source document 106.

Specifically, the cognitive computing services 102 performs the following steps:

1. A passage encoder 108 identifies the most relevant words in the source document 106 necessary for expansion. The summarization capabilities of the passage encoder 108 can also be useful for creating a "coarse summary" of the document source 106 and can also be used in automatic relationship detection (in situations where identifying every relationship in the source document 106 is not necessary; instead, only the relationships concerning the key concepts may be identified).

2. A text expansion 110 expands the relevant words using word embedding distance, information from an ontology, or multi-part analogies to extract targeted relationships.

3. A concept mapping 112 maps the expanded words to concepts and performs a concept disambiguation process to ensure incorrect concepts are not bootstrapped into the domain-specific vocabulary 104.

A user interface (UI) may be exposed, for example, in a web browser, to one or more client computing devices 114 operated by one or more end-users to access the domain-specific vocabulary 104 and source document 106, as well as control the cognitive computing services 102, including the passage encoder 108, text expansion 110 and concept mapping 112.

Cognitive Computing Services

In one embodiment, the cognitive computing services 102 are implemented using the Watson™ services offered by IBM Corporation, the assignee of the present invention. However, other machine learning services could also be used.

The Watson™ services comprise a set of services that can be used to create, store, deploy and use machine learning models for the passage encoder 108, text expansion 110 and concept mapping 112. Specifically, the Watson™ services provide an infrastructure for performing natural language processing of the source document 106 using machine learning, in order to generate the domain-specific vocabulary 104.

The key services provided by the Watson™ services include:
Repository service—Stores the models that are created so that they can be retrieved to create deployments.
Deployment service—Deploys models so that they can be used for predictions.
Scoring service—Uses the deployed models to perform data analysis and generate predictions from patterns found in the data.

The Watson™ services also provide application programming interfaces (APIs) that enable applications to search, explore, and administer collections of machine learning models. These APIs allow applications to use hypertext transport protocol (HTTP) requests to post data (create and update), read data (such as running queries), delete data, and return data (responses to queries). Alternative mechanisms may be used as well.

Passage Encoder

Figure 2:
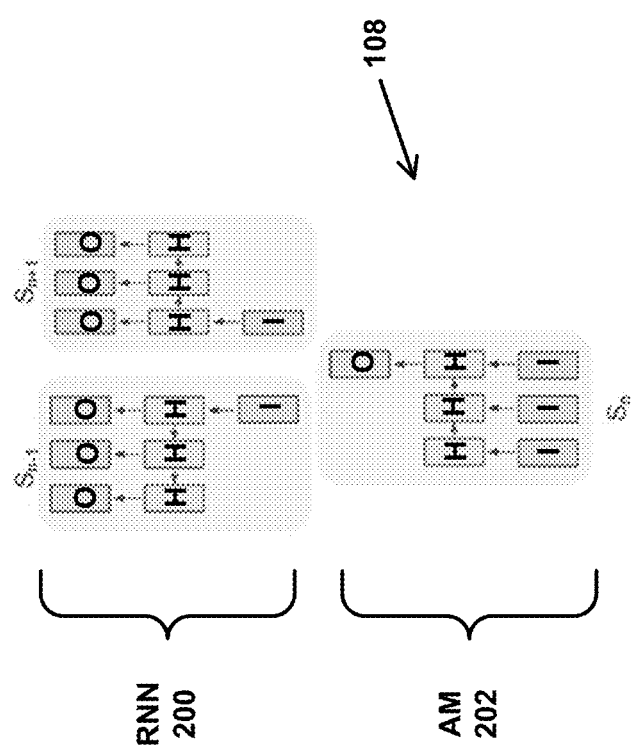
FIG. 2 illustrates a passage encoder, comprised of a recurrent neural network and an attention mechanism, according to one embodiment.

FIG. 2 illustrates the passage encoder 108, according to one embodiment. In this embodiment, the passage encoder 108 comprises a machine learning model based on an encoder/decoder architecture.

At training time, the passage encoder 108 inputs text from the source document 106, generates a vector representation of the text, and then uses that representation to make predictions about the surrounding context. The passage encoder 108 may not be good at making the predictions, but that objective causes the passage encoder 108 to learn a useful representation of the input text. The passage encoder 108 also determines word importance.

In one embodiment, the passage encoder 108 is implemented using a recurrent neural network (RNN) 200 with an attention mechanism (AM) 202. The RNN 200 and AM 202 comprise a neural network of nodes organized into layers, wherein the AM 202 is a layer on top of the RNN 200. Nodes are either input (I) nodes that input data, output (O) nodes that output data, or hidden (H) nodes that modify data. Each node in a layer is connected to every node in the next layer with a modifiable weight and a time-varying activation.

In the RNN 200, states $S_{n-1}$ and $S_{n+1}$ comprise one-to-many models; in the AM 202, state $S_n$ comprises a many-to-one model. The diagram in FIG. 2 represents the full train-time architecture of the RNN 200, including both an encoder and decoder, but just the encoder of the RNN 200 is used at run-time, and not the decoder.

The RNN 200 may have connections that provide feedback to one or more of the layers. Because the RNN 200 may include loops, it can store information while processing new input. This memory makes the RNN 200 ideal for processing tasks where prior inputs must be considered (such as time-series data).

In one embodiment, the RNN 200 and AM 202 are comprised of a gated recurrent unit (GRU), which is a memory cell. The GRU includes an update gate and a reset gate, wherein the update gate indicates how much of the previous cell contents to maintain, while the reset gate defines how to incorporate the new input with the previous cell contents. Thus, the GRU cell can retain its value for a time period as a function of its inputs.

The RNN 200 and AM 202 that comprise the passage encoder 108 operate in a manner different from other approaches to passage encoding:

1 Latent dirichlet allocation (LDA)—LDA cannot assign importance to words and typically only assigns documents to a preset set of topics.
2. Doc2Vec—While Doc2Vec can technically encode new documents after training time, it only creates a vector representation of the passage and does not have a human interpretable view of word importance.
3. Skip-Thought—Skip-Thought did provide some architectural inspiration for this invention, but it diverges in some significant ways as described in the following sections.

The passage encoder 108 is an evolutionary descendant of the Skip-Thought encoder, described in Ryan Kiros et al., "Skip-Thought Vectors," http://arxiv.org/abs/1506.06726, which is incorporated by reference herein.

Skip-Thought is a general purpose passage encoder that is trained as follows:
1. It is an RNN-based encoder/decoder architecture that is given a input sentence and asked to predict the sentences that came before it and after it. It is a sentence level analog of the skip-gram objective for word embeddings.
2. Each word in the output prediction space is represented as a softmax over a relatively small 20K vocabulary (e.g., 20,000 words), wherein the softmax calculates the probability of a word given its context.

It is worth noting that this training task is difficult, but it does cause the encoder layer to learn a reasonable representation of the sentence.

The original Skip-Thought paper set forth above provided a blueprint for a general purpose sentence encoder that could encode any sentence (as compared to something like Doc2Vec where the documents have to be embedded alongside the words when the embedding is created). However, Skip-Thought did have some problems that had to be addressed.

The first step is classification and clustering of clinical trial criteria. The original Skip-Thought had problems on this kind of text:
1. Skip-Thought does not deal well with a technical vocabulary. The authors of Skip-Thought used a relatively small 20K vocabulary mapped from a larger vocabulary space of 5 million. They did this because having a softmax of 5 million words at each prediction point would have resulted in a network with too many parameters to train in a reasonable amount of time (they trained their model for 2 weeks, even with 20K/slot). They only tested their model on "normal" English tasks. A vocabulary of 20K is fine for language like that, but it is insufficient for a highly technical domain like medicine.
2. Skip-Thought was too structurally focused. Consider the following two statements and how similar is their meaning:
Patients with a known history of drug abuse.
Patients with a known history of heart disease.
Structurally, these statements are very similar, but they clearly do not mean the same thing. Skip-Thought's objective made it more sensitive to structural similarity than was desirable. What was needed was a model that was topically aware.
3. Skip-Thought only operates on small chunks of text. This invention, however, needed an encoder that could handle full Medline™ abstracts (~300 words), as this was one of the other target use cases.

Consequently, the passage encoder 108 of this invention diverges from the original Skip-Thought model as follows:
1. The passage encoder 108 uses a continuous objective instead of a discrete objective. Skip-Thought forces the model to predict a discrete vocabulary slot, and the number of slots grows with the size of the vocabulary. The passage encoder 108 of this invention comprises a continuous prediction model where the model is asked to predict a vector that corresponds to the word. If the vocabulary size is 1 or 10 million, the size of the output prediction required by the model does not change. A minor downside of this is that the model is rewarded for being close in a way that it does not with a discrete prediction. To improve the model's precision, an auxiliary learning task is added that penalizes the model for predicting words near the middle of the embedding (i.e., stop words) to force the predictions into the more topically relevant regions of the embedding. Using continuous predictions in this way allows the use of a large vocabulary (1.2 million words in one embodiment) that is more appropriate for highly specialized domains.

2. Scale the model to larger sizes than sentences. A mechanism was needed to deal with arbitrary paragraphs (note that Doc2Vec has a variant of this function, but the passages have to be embedded at training time and do not assign importance to words). Training on sentences would not suffice. To fix this, the model was allowed to train on larger spans of text (e.g., 100 words), but could not just predict the previous 100 words and next 100 words in some scaled-up Skip-Thought analog. To give the model a reasonable training objective, words from both the surrounding context and training context are sampled based on a combination of Term Frequency (TF), which measures how frequently a term occurs in a document, and Inverse Document Frequency (IDF), which measures how important a term is, and the model was programmed to predict TF and IDF. (Note that the model could have been constructed closer to the original Skip-Thought objective and sampled just from the surrounding context, but the model was trained only on abstracts, and the resulting passage encoder 108 produced reasonable results.)

3. Make the model more topically aware. By only focusing on high IDF words or moderate IDF but frequent words, this removed the model's ability to focus on structural elements.

4. Assigning importance to words in the passage. As noted above, the AM 202 was added on top of the RNN 200, and is similar to a mechanism proposed by Tim Rocktaschel et al., "Reasoning about Entailment with Neural Attention," https://arxiv.org/pdf/1509.06664.pdf, which is incorporated by reference herein. This ended up being more useful than the passage vectors themselves. The AM 202 provides a unique coarse summarization of the passage.

Figure 3:
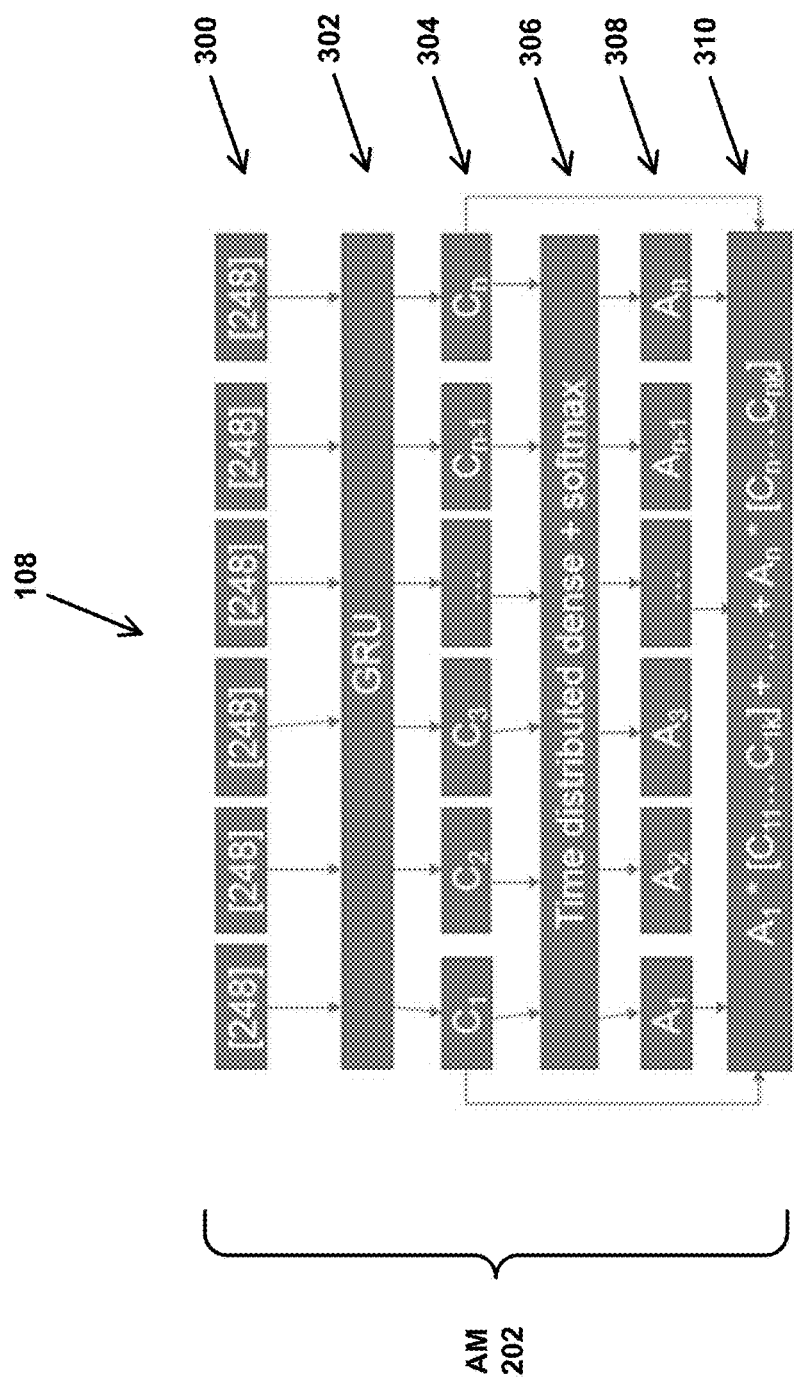
FIG. 3 is a representation of the attention mechanism, according to one embodiment.

FIG. 3 is a representation of the AM 202, according to one embodiment, which includes the inputs 300 (each [248] representing a word), a GRU 302 that functions as a memory, cells $C_1$-$C_n$ 304 that function as a context vector to identify neighbors for each word, a layer 306 comprised of both a time distributed dense layer (which keeps one-to-one relations on input and output) and a softmax function (which calculates the probability of a word given its context), cells $A_1$-$A_n$ 308 that function as an attention vector to assign an importance score for each word, and an output 310 comprising the following function:

$$A_1 * [C_{11} \ldots C_{1K}] + \ldots + A_n * [C_{n1} \ldots C_{nk}]$$

At runtime, the AM 202 provides the following:

1. A list of attention voltages for each word 300 in the sequence represented by the attention vector $A_1$-$A_n$ 308. Attention is simply a vector, namely the outputs of the layer 306.

2. An attention weighted representation of the RNN's 200 cell states to construct the output 310 comprising a final sequence representation. Note that in Rocktaschel's implementation, the final cell state is given more weight and that is not represented in this diagram.

Consider a source document 106 that contains the following passage:

Chemoprophylaxis is recommended for the following high-risk groups: 9.1.1 Non-immune visitors (tourists) The recommended medicines for chemoprophylaxis for non-immune persons visiting a malarious area are mefloquine, atovaquone-proguanil or doxycycline) 9.1.2 Patients with sickle cell disease The currently recommended prophylactic medicine for those with sickle cell disease is still proguanil. Although there is increasing documented resistance to anti-folate drugs, no studies on the effectiveness of proguanil in sickle cell disease have been conducted to recommend otherwise. It is important for patients with sickle-cell disease to consistently use other malaria prevention methods and to promptly seek treatment for any febrile illness. The currently recommended prophylactic medicine for those with tropical splenomegaly syndrome is proguanil. Although there is increasing documented resistance to antifolate drugs, no studies on the effectiveness of proguanil in this group have been conducted to recommend otherwise.

The passage encoder 108 returns a vector representation of the passage and weightings of word importance, for example, as set forth below:

| Vector Representation |
|---|
| { <br> "results": [ <br> [ <br> [ <br> −0.00009626978179899677, <br> 0.0015609601247567953, <br> 0.02245424854002245, <br> −0.017226946294520127, <br> 0.024523153852635916, <br> 0.005086039517064576, <br> −0.0036279878599931492, <br> −0.013908008833385763, <br> −0.0018171244586714958, <br> 0.022981652785508528, <br> 0.02653984422984904, <br> ... |

Word Importance
"proguanil: 0.243042",
"sickle_cell_disease: 0.138897",
"antifolate: 0.114932",
"chemoprophylaxis: 0.066661",
"mefloquine: 0.060366",
"tropical_splenomegaly_syndrome: 0.048136",
"atovaquone_proguanil: 0.047213",
. . .
"following: 0.000019",
"or: 0.000018",
"been: 0.000018",
"with: 0.000017",
"are: 0.000015",
"on: 0.000014",
"and: 0.000002"

The above vector representation shows the distribution of weights across all words of the vector and can be used for classification, clustering, or similarity comparison (for example, via cosine similarity), while the above word importance shows each word weighted by its importance, which is used to inform downstream tasks (i.e., the text expansion 110). Note that stop words do generate some voltage, but the voltage is very low, as the model knows that such words are unlikely to be predictive of topicality.

Text Expansion

After the passage encoder 108 identifies key topical words in the passage, the text expansion 110 can expand relevant words, for example, using lexical sources, based on the word importance rankings set forth above. These are the relative word importance rankings as judged by the passage encoder 108. Only the top few word importance rankings are shown here for brevity. Nonetheless, these word importance rankings identify the targets for expansion.

In one embodiment, a word embedding distance is used to perform the expansion; however, other mechanisms such as ontological information or targeted relationship extraction could also be used to perform the expansion.

The choice of how far to expand a concept may be governed by its word importance or a static expansion threshold could be used. In one embodiment, the static threshold expansion is used, and an embedding similarity threshold of 0.7 is set for the top 100 neighbors for each of the top N words by word importance found by the passage encoder 108.

The expansion for the source document 106 might comprise the following (truncated for brevity):

Expanding Proguanil
atovaquone_proguanil 0.879395484924
cycloguanil 0.877924740314
amodiaquine 0.875465333462
atovaquone 0.857018351555
fansidar 0.853971719742
piperaquine 0.850035190582
pyronaridine 0.843002378941
chlorproguanil 0.842939853668
. . .
Expanding Sickle_Cell_Disease
sickle 0.953397750854
sickle_cell 0.912928283215
sickle_cell_anemia 0.90927618742
sickle_cell_anaemia 0.845305383205
hemoglobinopathy 0.789590477943
sickle_cell_trait 0.775015115738
sickle_cell_diseases 0.760606169701
hemoglobinopathies 0.749954283237
. . .
Expanding Antifolate
antifolates 0.923304200172
trimetrexate 0.852294683456
polyglutamation 0.831380367279
anti_folate 0.799653708935
dhfr_inhibitors 0.788548231125
. . .

and so on. The above shows the word expanded, the expansion terms, and the weightings of the expansion terms relative to the word expanded.

"Sickle cell disease" is an important topic in the passage from the source document 106, but not in the source document 106 itself, which concerns malaria. Consequently, it not be desirable to expand that to its 100 nearest neighbors. To obtain better word importance weightings over a larger source document 106, the results from larger individual word chunks, e.g., 300 word chunks, could be aggregated in order to obtain a weighted average. However, that may differ in other embodiments, and the fact that the passage encoder 108 can provide judgements on the importance of words in text is the important factor.

Using just this passage as input to the text expansion 110 with the stock expansion settings mentioned above, the text expansion 110 creates a 600+ word vocabulary automatically.

Concept Mapping

Once the text expansion 110 provides a set of candidate words, there are three options that can be performed by the concept mapping 112:

1. Subset an existing ontology. The example below uses the Unified Medical Language System (UMLS), which is a compendium of many controlled vocabularies in the biomedical sciences. It provides a mapping structure among these vocabularies and thus allows one to translate among the various terminology systems; it may also be viewed as a comprehensive thesaurus and ontology of biomedical concepts.

2. Expand an existing ontology by adding surface forms that do not currently exist to existing concepts.

3. Create a new ontology with entirely new concepts from discovered surface forms that are not currently in an ontology.

Options 2 and 3 are interesting, but this embodiment focuses on option 1, as it is the fully automated path. Option 1 allows the concept mapping 112 to automatically map the expanded word list to concepts, but there is a possibility of mapping to concepts that are not topically relevant.

Consider the following passage from another source document 106:

> The incidence, time course, risk factors, and treatment of IFN-induced MDD are poorly understood. The objectives of the present study were to determine the incidence of IFN-induced MDD, as well as to determine the efficacy of open-label antidepressant treatment, in particular selective seretonin reuptake inhibitors (SSRIs) for IFN-induced MDD. Thirty-nine HCV patients on IFN therapy were monitored weekly using the Beck Depression Inventory (BDI). Those who became depressed were treated with citalopram, a SSRI antidepressant. Main outcome measures included the incidence of IFN-induced MDD, as well as response rates to antidepressants in those patients who developed IFN-induced MDD. Our results showed that 13 of 39 patients (33%) developed IFN-induced MDD.

This results in the following word importance rankings:
Word Importance
"mdd: 0.230018",
"ifn: 0.132486",
"antidepressant: 0.069055",
"ssris: 0.065147",
"bdi: 0.057643",
. . .

The term "mdd" is clearly important. If the concept mapping 112 tries to map that to concepts, the following results are obtained:
"cui: C0262218",
"preferredName": "densocellular part of the medial dorsal nucleus",
"cui: C1269683",
"preferredName": "Major Depressive Disorder",
"cui: C3812244",
"preferredName": "Minimal Disseminated Disease", In the above results, "cui: Cxxxxxxx" is a Concept Unique Identifier for a UMLS meta-thesaurus concept, and "preferredName: <term>" is the preferred name for the concept.

Clearly, this passage is referring to the concept of "Major Depressive Disorder" and the other two concepts are not relevant to a vocabulary 114 that is bootstrapped from this source document 106.

Clearly, this passage is referring to the concept of "Major Depressive Disorder" and the other two concepts are not relevant to a vocabulary 114 that is bootstrapped from this source document 106.

A concept disambiguation service can be used to evaluate the proposed concepts in context. Evaluating the source document 106 using the concept disambiguation service correctly isolates the correct concept:

```
...
{
"cui": "C0262218",
"preferredName": "densocellular part of the medial dorsal nucleus",
    "type": "umls.BodyPartOrganOrOrganComponent",
    "coveredText": "MDD",
"disambiguationData": {
***** "validity": "INVALID" *****
}
},
{
"cui": "C1269683",
"preferredName": "Major Depressive Disorder",
    "type": "umls.MentalOrBehavioralDysfunction",
    "coveredText": "MDD",
"disambiguationData": {
***** "validity": "VALID" *****
}
},
{
"cui": "C3812244",
"preferredName": "Minimal Disseminated Disease",
    "type": "umls.Finding",
    "coveredText": "MDD",
"disambiguationData": {
***** "validity": "INVALID" *****
}
},
```

In the above results, "cui: Cxxxxxxx" is a Concept Unique Identifier for a UMLS meta-thesaurus concept; "preferredName: <term>" is the preferred name for the concept; "type" is the semantic type associated with the concept; "coveredText" is the text covered by an annotation as a string; and "disambiguationData" indicates whether the concept is valid or invalid for the term, even though the coveredText may be the same as the term.

At this point, the cognitive services 102 have generated a fully disambiguated vocabulary 104 comprising a dictionary of words and concepts that was bootstrapped from the source document 106.

In one embodiment, the entire process was automated and had no user interaction. In other embodiments, the passage encoder 108 may generate a set of words that are important and then an end-user would select from the set of words for expansion and by how much.

Flowchart

Figure 4:
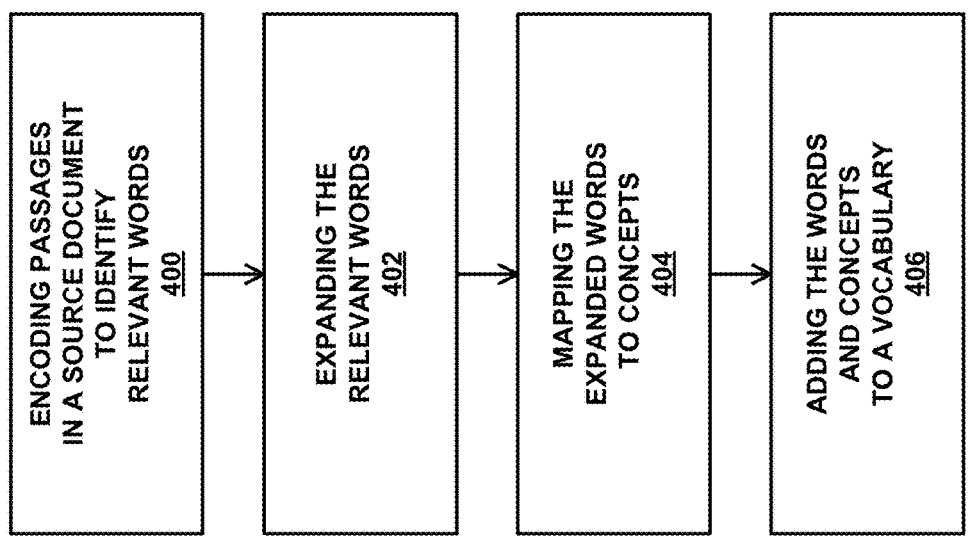
FIG. 4 illustrates an exemplary method for automatically bootstrapping a domain-specific vocabulary from at least one source document using one or more computers, according to one embodiment.

FIG. 4 illustrates an exemplary method for automatically bootstrapping a domain-specific vocabulary 104 from at least one source document 106 using one or more computers, according to one embodiment.

Block 400 represents the passage encoder 108 encoding one or more passages in the source document 106 to identify one or more relevant words therein, wherein the encoding assigns an importance to the relevant words using an attention mechanism (AM) 202 on top of a recurrent neural network (RNN) 200.

Block 402 represents the text expansion 110 expanding the relevant words using word embedding distance, ontology information, or multi-part analogies.

Block 404 represents the concept mapping 112 mapping the expanded words to concepts for inclusion into the domain-specific vocabulary 104, wherein concept disambiguation is performed to ensure that incorrect concepts are not included into the domain-specific vocabulary 104.

Block 406 represents the expanded words and concepts being added into the domain-specific vocabulary 104.

Cloud Computing

It is to be understood that, although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
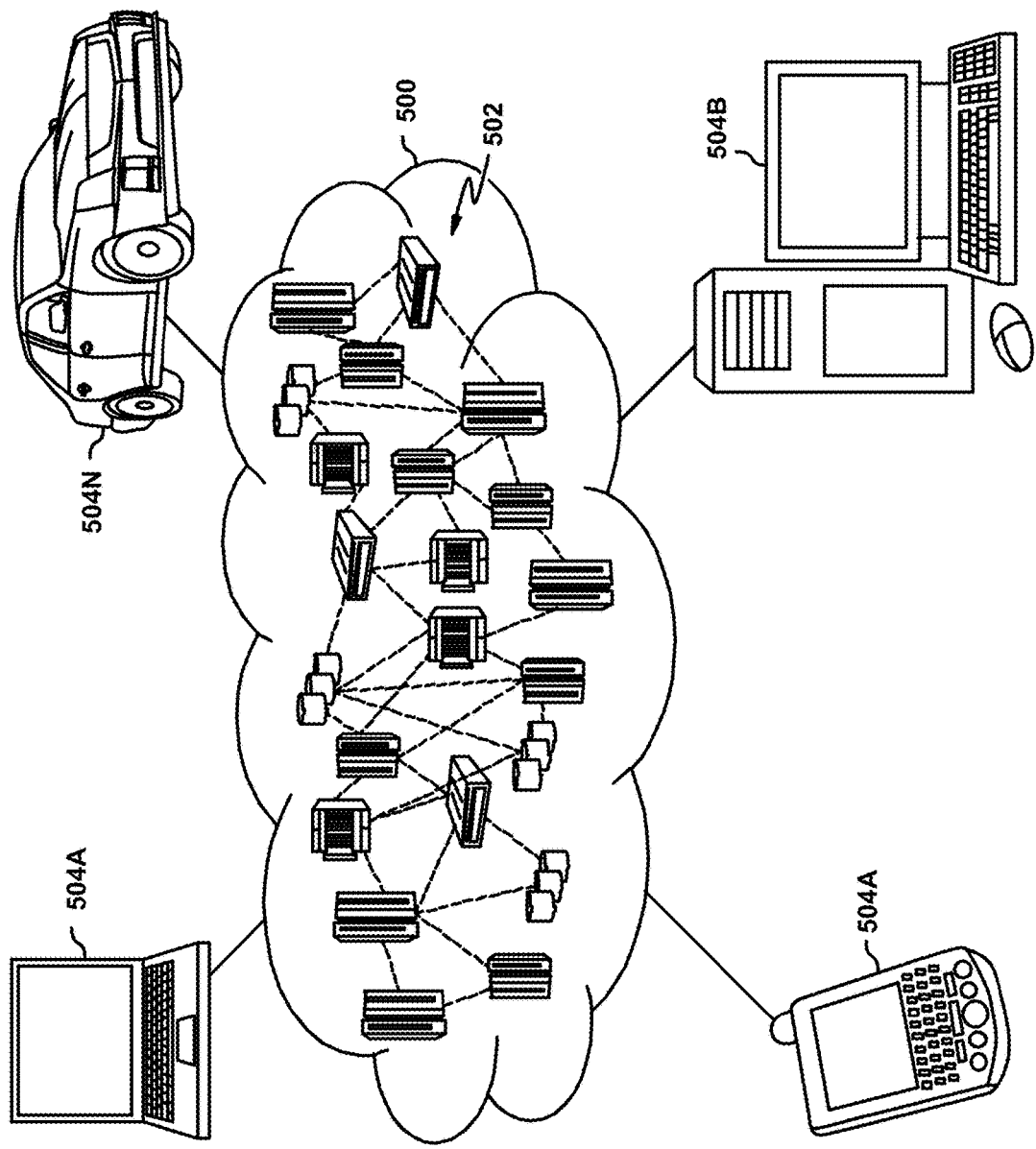
FIG. 5 is a depiction of an illustrative cloud computing environment, according to one embodiment.

Referring now to FIG. 5, an illustrative cloud computing environment 500 is depicted. As shown, cloud computing environment 500 includes one or more cloud computing nodes 502 with which local computing devices used by cloud consumers, such as, for example, personal digital assistant (PDA) or cellular telephone 504A, desktop computer 504B, laptop computer 504C, and/or automobile computer system 504N may communicate. Nodes 502 may communicate with one another. They may be grouped (not shown) physically or virtually, in one or more networks, such as Private, Community, Public, or Hybrid clouds as described hereinabove, or a combination thereof. This allows cloud computing environment 10 to offer infrastructure, platforms and/or software as services for which a cloud consumer does not need to maintain resources on a local computing device. It is understood that the types of computing devices 504A-N shown in FIG. 5 are intended to be illustrative only and that computing nodes 502 and cloud computing environment 500 can communicate with any type of computerized device over any type of network and/or network addressable connection (e.g., using a web browser).

Figure 6:
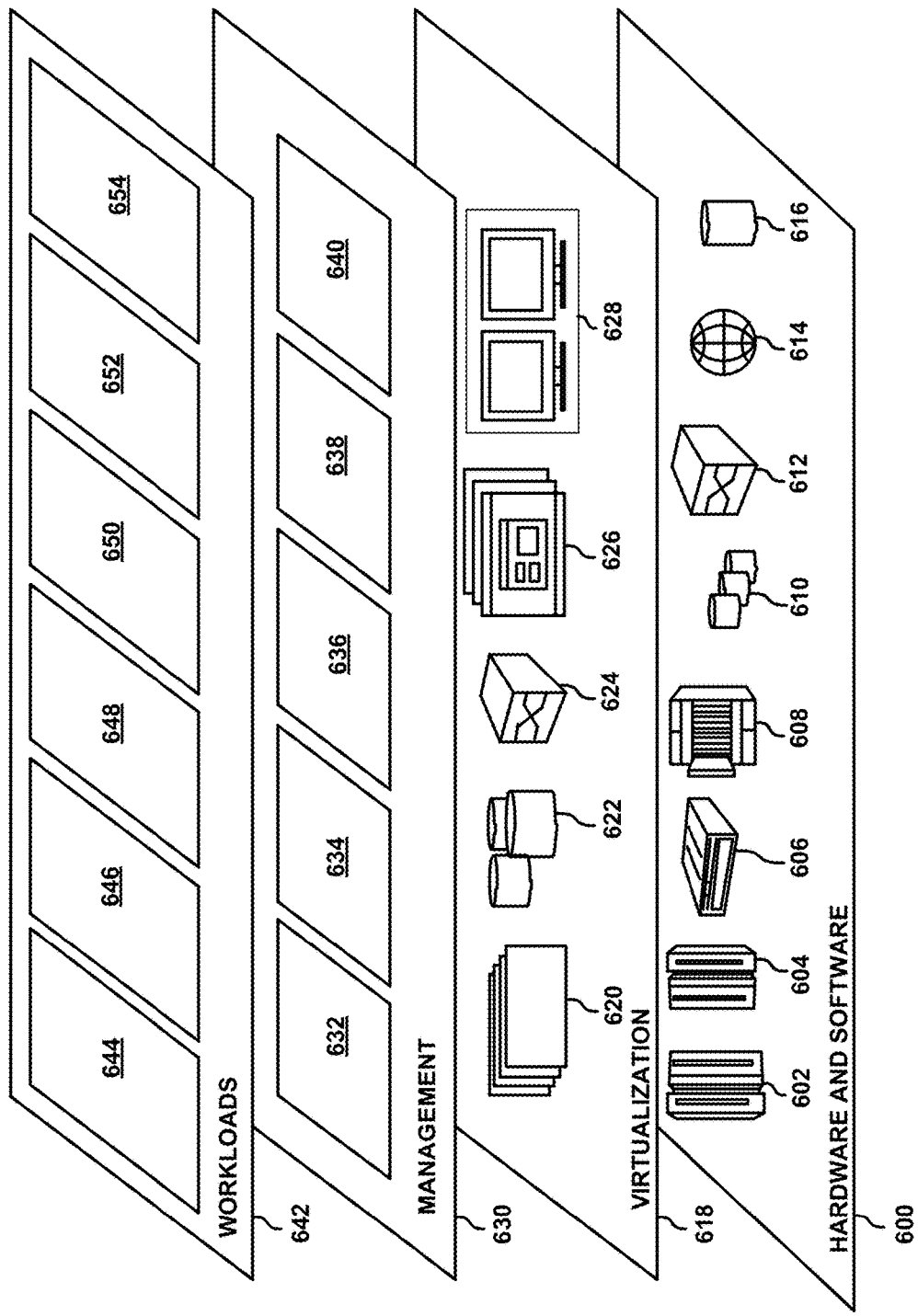
FIG. 6 shows a set of functional abstraction layers provided by a cloud computing environment, according to one embodiment.

Referring now to FIG. 6, a set of functional abstraction layers provided by a cloud computing environment is shown. It should be understood in advance that the components, layers, and functions shown in FIG. 6 are intended to be illustrative only and embodiments of the invention are not limited thereto. As depicted, the following layers and corresponding functions are provided:

Hardware and software layer 600 includes hardware and software components. Examples of hardware components include: one or more computers such as mainframes 602, RISC (Reduced Instruction Set Computer) architecture based servers 604, servers 606, and blade servers 608; storage devices 610; and networks and networking components 612. In some embodiments, software components include network application server software 614 and database software 616.

Virtualization layer 618 provides an abstraction layer from which the following examples of virtual entities may be provided: virtual servers 620; virtual storage 622; virtual networks 624, including virtual private networks; virtual applications and operating systems 626; and virtual clients 628.

In one example, management layer 630 may provide the functions described below. Resource provisioning 632 provides dynamic procurement of computing resources and other resources that are utilized to perform tasks within the cloud computing environment. Metering and pricing 634 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 636 provides access to the cloud computing environment for consumers and system administrators. Service level management 638, which includes containers, provides cloud computing resource allocation and management such that required service levels are met. Service Level Agreement (SLA) planning and fulfillment 640 provide pre-arrangement for, and procurement of, cloud computing resources for which a future requirement is anticipated in accordance with an SLA.

Workloads layer 642 provides examples of functionality for which the cloud computing environment may be utilized. Examples of workloads, tasks and functions which may be provided from this layer include: mapping and navigation 644; software development and lifecycle management 646; virtual classroom education delivery 648; data analytics processing 650; transaction processing 652; and automatically bootstrapping a domain-specific vocabulary from a source document 654.

Computer Program Product

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to illustrations and/or block diagrams of methods, apparatus (systems), and computer program products according to embodiments of the invention. It will be understood that each block of the illustrations and/or block diagrams, and combinations of blocks in the illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the illustrations and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the illustrations and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the illustrations and/or block diagram block or blocks.

The illustrations and block diagrams in the Figures illustrate the architecture, functionality, and operation of possible implementations of systems, methods, and computer program products according to various embodiments of the present invention. In this regard, each block in the illustrations or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or illustrations, and combinations of blocks in the block diagrams and/or illustrations, can be implemented by special purpose hardware-based systems that perform the specified functions or acts or carry out combinations of special purpose hardware and computer instructions.

Conclusion

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implement method, comprising:
   automatically bootstrapping a domain-specific vocabulary from at least one source document using one or more computers, by:
   encoding one or more arbitrary paragraphs from the source document to identify one or more relevant words therein, by:

assigning an importance to the relevant words using an attention mechanism (AM) on top of a recurrent neural network (RNN);
predicting a vector that corresponds to the relevant words using a continuous prediction model;
penalizing predicted words near an embedding to force predictions into topically relevant regions of the embedding using an auxiliary learning task;
sampling words in the one or more arbitrary paragraphs based on a combination of Term Frequency (TF) to measure how frequently each of the relevant words occur in the one or more arbitrary paragraphs, and Inverse Document Frequency (IDF) to measure an importance for each of the relevant words;
expanding the relevant words using word embedding distance, ontology information, or multi-part analogies; and
mapping the expanded words to concepts for inclusion into the domain-specific vocabulary, wherein concept disambiguation is performed to ensure that incorrect concepts are not included into the domain-specific vocabulary.

2. The method of claim 1, wherein the encoding further comprises creating a summary of the document source.

3. The method of claim 1, wherein the encoding further comprises identifying relationships concerning concepts in the source document.

4. The method of claim 1, wherein the attention mechanism provides a summarization of the passages.

5. The method of claim 1, wherein the encoding generates a vector representation of the passages.

6. The method of claim 5, wherein the vector representation is used for classification, clustering, or similarity comparison.

7. The method of claim 1, wherein the encoding generates weightings of word importance in the passages.

8. The method of claim 7, wherein the expanding comprises expanding the relevant words, based on the weightings of word importance as determined by the encoding.

9. The method of claim 1, wherein the mapping comprises subsetting an existing ontology.

10. The method of claim 1, wherein the mapping comprises expanding an existing ontology by adding surface forms that do not currently exist to existing concepts.

11. The method of claim 1, wherein the mapping comprises creating a new ontology with new concepts from discovered surface forms that are not currently in an ontology.

12. A computer-implemented system, comprising:
one or more computers programmed for automatically bootstrapping a domain-specific vocabulary from at least one source document using one or more computers, by:
encoding one or more arbitrary paragraphs from the source document to identify one or more relevant words therein, by:
assigning an importance to the relevant words using an attention mechanism (AM) on top of a recurrent neural network (RNN);
predicting a vector that corresponds to the relevant words using a continuous prediction model;
penalizing predicted words near an embedding to force predictions into topically relevant regions of the embedding using an auxiliary learning task;
sampling words in the one or more arbitrary paragraphs based on a combination of Term Frequency (TF) to measure how frequently each of the relevant words occur in the one or more arbitrary paragraphs, and Inverse Document Frequency (IDF) to measure an importance for each of the relevant words;
expanding the relevant words using word embedding distance, ontology information, or multi-part analogies, wherein the expansion is governed by the measured importance for each of the relevant words;
mapping the expanded words to concepts for inclusion into the domain-specific vocabulary, wherein concept disambiguation is performed to ensure that incorrect concepts are not included into the domain-specific vocabulary; and
generating the domain-specific vocabulary the identified relevant words, the expanded words, and mapped concepts bootstrapped from the source document.

13. The system of claim 12, wherein the encoding further comprises identifying relationships concerning concepts in the source document.

14. The system of claim 12, wherein the mapping comprises subsetting an existing ontology.

15. The system of claim 12, wherein the mapping comprises expanding an existing ontology by adding surface forms that do not currently exist to existing concepts.

16. The system of claim 12, wherein the mapping comprises creating a new ontology with new concepts from discovered surface forms that are not currently in an ontology.

17. A computer program product, the computer program product comprising a computer readable storage medium having program instructions embodied therewith, the program instructions executable by one or more computers to cause the computers to perform a method comprising:
automatically bootstrapping a domain-specific vocabulary from at least one source document using one or more computers, by:
encoding one or more arbitrary paragraphs from the source document to identify one or more relevant words therein, by:
assigning an importance to the relevant words using an attention mechanism (AM) on top of a recurrent neural network (RNN);
predicting a vector that corresponds to the relevant words using a continuous prediction model;
penalizing predicted words near an embedding to force predictions into topically relevant regions of the embedding using an auxiliary learning task;
sampling words in the one or more arbitrary paragraphs based on a combination of Term Frequency (TF) to measure how frequently each of the relevant words occur in the one or more arbitrary paragraphs, and Inverse Document Frequency (IDF) to measure an importance for each of the relevant words;
expanding the relevant words using word embedding distance, ontology information, or multi-part analogies based only on the one or more arbitrary paragraphs, wherein the expansion is governed by a static expansion threshold;
mapping the expanded words to concepts for inclusion into the domain-specific vocabulary;
using a concept disambiguation service to evaluate the concepts in context to ensure that incorrect concepts are not excluded from the domain-specific vocabulary; and generating the domain-specific vocabulary the identified relevant words, the expanded words, and mapped concepts bootstrapped from the source document.

18. The computer program product of claim 17, wherein the mapping comprises subsetting an existing ontology.

19. The computer program product of claim 17, wherein the mapping comprises expanding an existing ontology by adding surface forms that do not currently exist to existing concepts.

20. The computer program product of claim 17, wherein the mapping comprises creating a new ontology with new concepts from discovered surface forms that are not currently in an ontology.

* * * * *